(12) United States Patent
Olsson et al.

(10) Patent No.: US 8,548,517 B2
(45) Date of Patent: Oct. 1, 2013

(54) EVENT HANDLING IN A RADIO CIRCUIT

(75) Inventors: Thomas Olsson, Karlshamn (SE); Lars Sundström, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 403 days.

(21) Appl. No.: 12/934,157

(22) PCT Filed: Mar. 23, 2009

(86) PCT No.: PCT/EP2009/053388
§ 371 (c)(1),
(2), (4) Date: Dec. 10, 2010

(87) PCT Pub. No.: WO2009/121748
PCT Pub. Date: Oct. 8, 2009

(65) Prior Publication Data
US 2012/0087443 A1    Apr. 12, 2012

Related U.S. Application Data

(60) Provisional application No. 61/042,213, filed on Apr. 3, 2008.

(30) Foreign Application Priority Data

Mar. 31, 2008   (EP) ..................................... 08153718

(51) Int. Cl.
*H04M 1/00*    (2006.01)
(52) U.S. Cl.
USPC ...................................................... 455/550.1
(58) Field of Classification Search
USPC ......................... 455/73, 550.1; 375/354, 356
See application file for complete search history.

(56) References Cited

U.S. PATENT DOCUMENTS

2003/0149809 A1    8/2003   Jensen et al.
2003/0153368 A1*   8/2003   Bussan et al. ................. 455/574
(Continued)

FOREIGN PATENT DOCUMENTS

JP    2003318732 A    11/2003
JP    2004112750 A     4/2004
(Continued)

OTHER PUBLICATIONS

Extended European Search Report, dated May 16, 2012, in connection with European Patent Application No. 12161599.1-1525.
(Continued)

*Primary Examiner* — Nguyen Vo
(74) *Attorney, Agent, or Firm* — Potomac Patent Group PLLC

(57) ABSTRACT

A radio circuit comprises an interface unit for communicating data and commands over a communication link between a digital baseband circuit and the radio circuit. Furthermore, the radio circuit comprises an event-scheduling unit, a local time-reference unit, a synchronization unit, and an execution-control unit. The event-scheduling unit is arranged to receive event-request commands specifying an event to be executed in the radio circuit and a time instant at which the specified event is to be executed, from the digital baseband circuit. Furthermore, the event-scheduling unit is arranged to, in response to receiving an event request-command, schedule the specified event to be executed on the specified time instant. The execution-control unit is arranged to issue execution of each scheduled event at the scheduled time instant based on time information from the local time reference unit. The local time-reference unit is synchronized with a time-reference unit in the digital baseband circuit in response to a synchronization command, from the synchronization unit.

19 Claims, 5 Drawing Sheets

(56) References Cited

U.S. PATENT DOCUMENTS

| | | | |
|---|---|---|---|
| 2004/0204096 A1* | 10/2004 | Hirsch et al. | 455/561 |
| 2006/0013293 A1* | 1/2006 | Hirsch | 375/220 |
| 2006/0239337 A1 | 10/2006 | Green et al. | |
| 2008/0107218 A1* | 5/2008 | Geissler et al. | 375/356 |
| 2008/0247445 A1* | 10/2008 | Guo et al. | 375/220 |

FOREIGN PATENT DOCUMENTS

| | | |
|---|---|---|
| JP | 2006502679 A | 1/2006 |
| JP | 2006345545 A | 12/2006 |
| JP | 2007521714 A | 8/2007 |

OTHER PUBLICATIONS

PCT International Search Report, mailed Jun. 25, 2009, in connection with International Application No. PCT/EP2009/053388.

International Preliminary Report on Patentability, mailed Jun. 23, 2010, in connection with International Application N. PCT/EP2009/053388.

Qinglong Wu et al. "A mobile-agent based distributed intelligent control system architecture for home automation" 2001 IEEE International Conference on Systems Man and Cybernetics. Tuscon, AZ, Oct. 7-10, 2001; New York, NY, IEEE, US, vol. 3, Oct. 7, 2001, pp. 1648-1653, XP010570174. ISBN: 978-0-7803-7087-6.

Japanese Office Action, mailed Mar. 29, 2013, in connection with counterpart Japanese Patent Application No. 2011-501190 (see translation below).

Translation of Japanese Office Action, mailed Mar. 29, 2013, in connection with counterpart Japanese Patent Application No. 2011-501190.

* cited by examiner

US 8,548,517 B2

EVENT HANDLING IN A RADIO CIRCUIT

CROSS-REFERENCE TO RELATED APPLICATIONS

This application claims priority under 35 U.S.C. §119 to European Patent Application No. 08153718.5 filed Mar. 31, 2008, which is hereby incorporated herein by reference in its entirety. This application also claims the benefit of U.S. Provisional Application No. 61/042,213, filed Apr. 3, 2008, which is hereby incorporated herein by reference in its entirety.

TECHNICAL FIELD

The present invention relates to a radio circuit. More particularly, the present invention relates to event handling in a radio circuit.

BACKGROUND

Radio communication devices, such as mobile telephones and similar equipment, are becoming increasingly complex. Emerging communication standards, e.g. LTE (Long Term Evolution) and IMT (International Mobile Telecommunication) advanced, will provide high data rates and be based on complex techniques and algorithms to transmit and receive signals. For example, techniques used for efficient transmission, such as modulation schemes, coding, channel estimation, synchronization etc. continue to grow in complexity with the evolution of standards. The increased complexity also applies to the radio circuitry that serves as an interface between the antenna and the digital baseband circuit, which is hosting the algorithms for modulation, coding etc. For example, the complexity of the radio circuitry may increase due to an increased number of frequency bands and modes of operation that need to be supported. Hence, radio circuitry may need to be reconfigured based on mode of operation.

Furthermore, many parts of the radio circuitry are normally designed and operated to cater for worst-case scenarios stipulated by standard specifications. Such scenarios may be relatively rare or even non-existent. Therefore, a more flexible radio circuit that can provide just enough performance at any given time may be advantageous e.g. in order to save power. This would require an increased degree of reconfigurability, resulting in a further increased complexity.

In order to facilitate such increased reconfigurability and flexibility, there is a need for a technique to facilitate time accurate control of the radio circuitry with respect to reconfiguration, data streams, calibration, debugging, etc. from the digital baseband circuit. US 2006/0239337 discloses a method in a transceiver of receiving digital control information that includes both event and schedule information from a baseband processor. The digital control information is stored in a storage of the transceiver, and the transceiver is operated according to the event and schedule information. To control the timing of the events in the transceiver, the baseband processor supplies a strobe signal via a dedicated signal line to the transceiver. Scheduling the events in relation to a strobe signal as disclosed in US 2006/0239337 provides a relatively limited scheduling flexibility. Furthermore, the use of the strobe signal adds to the complexity of the interface circuitry. For example, if the transceiver and the baseband processor reside on separate integrated circuits (ICs), dedicated pins for the strobe signal are needed on the baseband processor IC and the transceiver IC.

In view of the above, there is a need for improved circuitry for radio communication.

SUMMARY

Accordingly, an object of the present invention is to improve circuitry for radio communication.

According to a first aspect, a radio circuit for operation with a digital baseband circuit is provided. The radio circuit comprises an interface unit for communicating data and commands over a communication link between the digital baseband circuit and the radio circuit. Furthermore, the radio circuit comprises an event-scheduling unit. The event scheduling unit is arranged to receive event-request commands from the digital baseband circuit. Each event-request command specifies an event to be executed in the radio circuit and a time instant at which the specified event is to be executed. Moreover, the event-scheduling unit is arranged to, in response to receiving an event request-command, schedule the specified event to be executed on the specified time instant.

In addition, the radio circuit comprises a local time-reference unit. The radio circuit further comprises a synchronization unit for synchronizing the local time-reference unit with a time-reference unit in the digital baseband circuit in response to a synchronization command. Furthermore, the radio circuit comprises an execution-control unit arranged to issue execution of each scheduled event at the scheduled time instant based on time information from the local time reference unit.

The event-scheduling unit may be arranged to receive prioritized event-request commands from the digital baseband circuit. Each prioritized event request command may specify a prioritized event to be executed in the radio circuit. The event-scheduling unit may further be arranged to, in response to receiving a prioritized event-request command from the digital baseband circuit, schedule the specified prioritized event for immediate execution. Furthermore, the execution-control unit may be arranged to issue immediate execution of each prioritized event scheduled for immediate execution.

The local time-reference unit may comprise a counter.

The synchronization unit may be arranged to set the local time-reference unit to a specific time value indicated by the synchronization command.

The synchronization unit may be arranged to communicate a current time value of the local time-reference unit to the digital baseband circuit in response to the synchronization command.

The radio circuit may be arranged to receive a loop-back request command from the digital baseband circuit. Furthermore, the radio circuit may be arranged to, in response to receiving a loop-back request command, immediately return a confirmation command to the digital baseband circuit. Thereby, determination in the digital baseband circuit of a latency of the communication link between the digital baseband circuit and the radio circuit is facilitated.

The event-scheduling unit may comprise at least one event queue. Furthermore, for each of the at least one event queue, the event-scheduling unit may comprise an event-handler unit adapted to store events in the event queue sorted in an order of the time instant associated with each event. The event-scheduling unit may further comprise a first-in/first-out memory operatively connected to the interface unit for receiving event-request commands from the digital baseband circuit. Moreover, the event-scheduling unit may comprise an event-dispatcher unit arranged to retrieve event-request commands from the first-in/first-out memory and, for each retrieved event-request command, forward an event associated with the event-request command to one of the event handler units based on address information in the event-request command.

The event-scheduling unit may be adapted to receive event-request commands comprising data associated with the event specified by the event-request command.

A set of events that the radio circuit is adapted to execute may comprises one or more of, but is not limited to a reconfiguration event for reconfiguring a hardware unit in the radio circuit, a measurement event for measuring a state of a hardware unit in the radio circuit, a measurement data receive event for receiving measurement data generated during a measurement event, a power-down event, a power-up event, a sleep event, a wake-up event, a calibration event for calibrating a hardware unit in the radio circuit, a data-transmission event, a reset event for restoring a setting of the radio circuit to a default setting, and a debugging event.

The radio circuit may be adapted to send event-request commands to the digital baseband circuit for requesting events to be executed in the digital baseband circuit.

According to a second aspect, a communication circuit is provided. The communication circuit comprises a radio circuit according to the first aspect. Furthermore, the communication circuit comprises a digital baseband circuit. The digital baseband circuit comprises a time reference unit and is adapted to issue and send event-request commands to the radio circuit.

The digital baseband circuit in the communication circuit may be arranged to receive event-request commands from the radio circuit. Each such event request command may specify an event to be executed in the digital baseband circuit and a time instant at which the specified event is to be executed. Furthermore, the digital baseband circuit in the communication circuit may be arranged to, in response to receiving an event request-command, schedule the specified event to be executed on the specified time instant. Moreover, the digital baseband circuit in the communication circuit may be arranged to execute each scheduled event at the scheduled time instant based on time information from the time-reference unit of the digital baseband circuit.

According to a third aspect, an electronic apparatus is provided. The electronic apparatus comprises a radio circuit according to the first aspect. The electronic apparatus may e.g. be, but is not limited to, any of a portable radio communication equipment, a mobile radio terminal, a mobile telephone, a communicator, an electronic organizer, a smartphone, and a computer.

According to a fourth aspect, a method of operating a radio circuit is provided. According to the method, a local time-reference unit of the radio circuit is synchronized with a time-reference unit in a digital baseband circuit in response to a synchronization command. Furthermore, according to the method, event-request commands are received from the digital baseband circuit. Each event-request command specifies an event to be executed in the radio circuit and a time instant at which the specified event is to be executed. Moreover, in response to receiving an event request-command, the specified event is scheduled to be executed on the specified time instant. In addition, each scheduled event is executed at the scheduled time instant based on time information from the local time reference unit.

According to a fifth aspect, a computer program product comprises computer program code means for executing the method according to the fourth aspect, when said computer program code means are run by an electronic device having computer capabilities.

According to a sixth aspect, a computer readable medium has stored thereon a computer program product comprising computer program code means for executing the method according to the fourth aspect, when said computer program code means are run by an electronic device having computer capabilities.

It is an advantage of embodiments of the invention that an improved flexibility of scheduling events for execution in a radio circuit is facilitated. For example, it is an advantage of some embodiments of the invention that scheduling of events for execution relatively long ahead is facilitated. Moreover, it is an advantage of some embodiments of the invention that event-request commands may be issued in an arbitrary order, e.g. not necessarily in the same order as the events are to be executed in the radio circuit.

Further embodiments of the invention are defined in the dependent claims.

It should be emphasized that the term "comprises/comprising" when used in this specification is taken to specify the presence of stated features, integers, steps, or components, but does not preclude the presence or addition of one or more other features, integers, steps, components, or groups thereof.

BRIEF DESCRIPTION OF THE DRAWINGS

Further objects, features and advantages of embodiments of the invention will appear from the following detailed description, reference being made to the accompanying drawings, in which.

DETAILED DESCRIPTION

Figure 1:
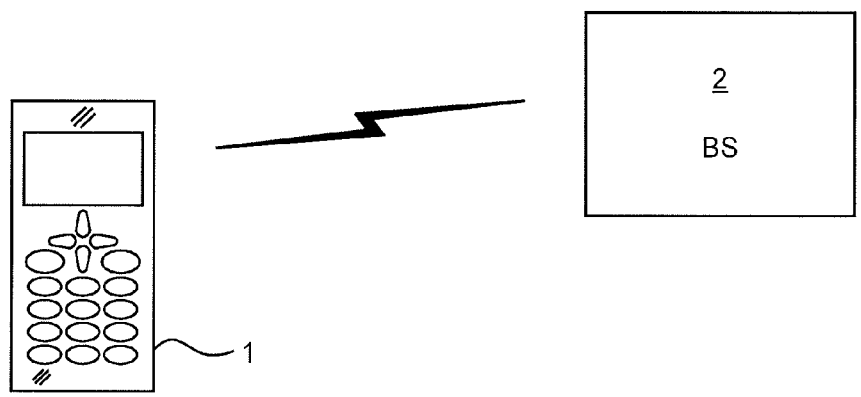
FIG. 1 illustrates schematically a mobile telephone in communication with a base station.

FIG. 1 illustrates an environment where embodiments of the present invention may be employed. An electronic apparatus 1 with radio communication capabilities is adapted to communicate with a base station (BS) 2 via radio signals. In FIG. 1, the electronic apparatus 1 is illustrated as a mobile telephone. However, this is only an example and not intended to limit the scope of the present invention. For example, the electronic apparatus 1 may be, but is not limited to, a portable radio communication equipment, a mobile radio terminal, a communicator, i.e. an electronic organizer, a smartphone, or the like, or a personal computer (PC), e.g. a laptop. The electronic apparatus 1 may e.g. be adapted for radio communication in one or more types of communication systems, such as but not limited to one or more of GSM (Global System for Mobile communication), UMTS (Universal Mobile Telecommunications System), LTE (Long Term Evolution), and IMT (International Mobile Telecommunication) communication systems.

Furthermore, a single BS 2 is used as illustration in FIG. 1. However, this is only an example. The electronic apparatus 1 may be arranged to be operatively connected to a plurality of BSs, operating within the same type or different types of communication systems. For example, the electronic apparatus 1 may be operatively connected to a plurality of BSs in order to facilitate so called soft handover (SHO) between BSs.

Figure 2:
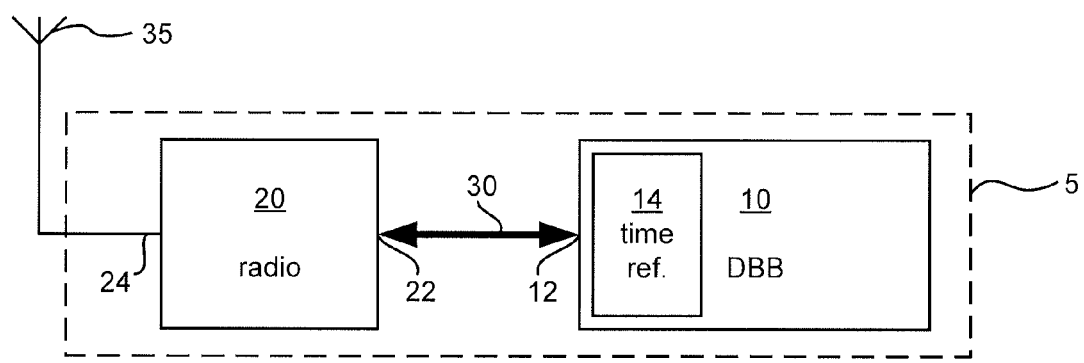
FIG. 2 is a block diagram of a communication circuit according to an embodiment of the invention.

FIG. 2 is a simplified block diagram of a communication circuit 5 according to an embodiment of the invention. The communication circuit 5 may e.g. be comprised in the electronic apparatus 1 (FIG. 1). The communication circuit 5 may e.g. be a radio modem. According to the embodiment illustrated in FIG. 2, the communication circuit 5 comprises a digital baseband circuit (DBB) 10. The DBB 10 has an I/O (Input/Output) port 12. Furthermore, according to the embodiment, the DBB 10 comprises a time-reference unit 14. The time reference unit 14 may be used for providing a reference time for appropriate timing of occurrences of events in the communication circuit 5. According to some embodiments, the time reference unit 14 may comprise a counter, which e.g. may be triggered by a positive or negative edge of a clock signal of the communication circuit. Hence, a counter value of the counter in the time reference unit 14 may indicate the number of (positive or negative) clock signal edges that have passed since the previous reset (or overflow) of the counter. Said counter value may be used as a value of said reference time. The number of bits of the counter and the frequency of the clock signal triggering the counter may e.g. be chosen based on how accurately and how long ahead events need to be scheduled in time; the more accurately events need to be scheduled, the higher the frequency, and the longer ahead events need to be scheduled, the more bits should be used in the counter. As a nonlimiting example, a clock frequency of 19.5 MHz, which is $\frac{1}{16}$ of the base frequency 312 MHz of a DigRF standard interface, may be used, whereby events may be scheduled with a timing resolution of approximately 51.3 ns. According to e.g. the 3GPP specifications, a radio frame may have a duration of 10 ms and comprise 15 time slots. For a clock frequency of 19.5 MHz, an 18-bit counter results in a counter value that repeats itself approximately every 13.4 ms, and hence suffices to allow events to be scheduled in advance to be executed at any time within a radio frame. Similarly, again for a clock frequency of 19.5 MHz, a 14-bit counter results in a counter value that repeats itself approximately every 840 µs, and hence suffices to allow events to be scheduled in advance to be executed at any time within a time slot.

According to the embodiment illustrated in FIG. 2, the communication circuit 5 comprises a radio circuit 20. The radio circuit 20 has an I/O port 22. As illustrated in FIG. 2, the I/O port 22 of the radio circuit 20 may be arranged in operative connection with the I/O port 12 of the DBB 10, e.g. for communication of data and/or commands over a communication link 30 between the DBB 10 and the radio circuit 20. The communication link 30 may e.g. be, but is not limited to, a communication link in accordance with the DigRF standard. Furthermore, according to the embodiment illustrated in FIG. 2, the radio circuit 20 has an RF (Radio Frequency) port 24, adapted for connection to an antenna 35 for receiving and/or transmitting RF signals. Although a single antenna is illustrated in FIG. 2, multiple antennas may well be used. For example separate transmit and receive antennas may be used. Furthermore, multiple antennas, e.g. arranged in a MIMO (Multiple Input Multiple Output) or similar antenna arrangement, may also be used for receiving and/or transmitting RF signals.

Moreover, only a single radio circuit 20 and a single DBB 10 is illustrated in FIG. 2. However, this is only an example. More generally, the communication circuit 5 may comprise at least one DBB, each of which may be operatively connected to at least one radio circuit of the communication circuit 5 via communication links such as the communication link 30 in FIG. 2. For example, separate DBBs may be employed for different types of communication systems. One or more of these DBBs may share the same radio circuit. Similarly, separate radio circuits may e.g. be employed for different frequency bands etc.

Figure 3:
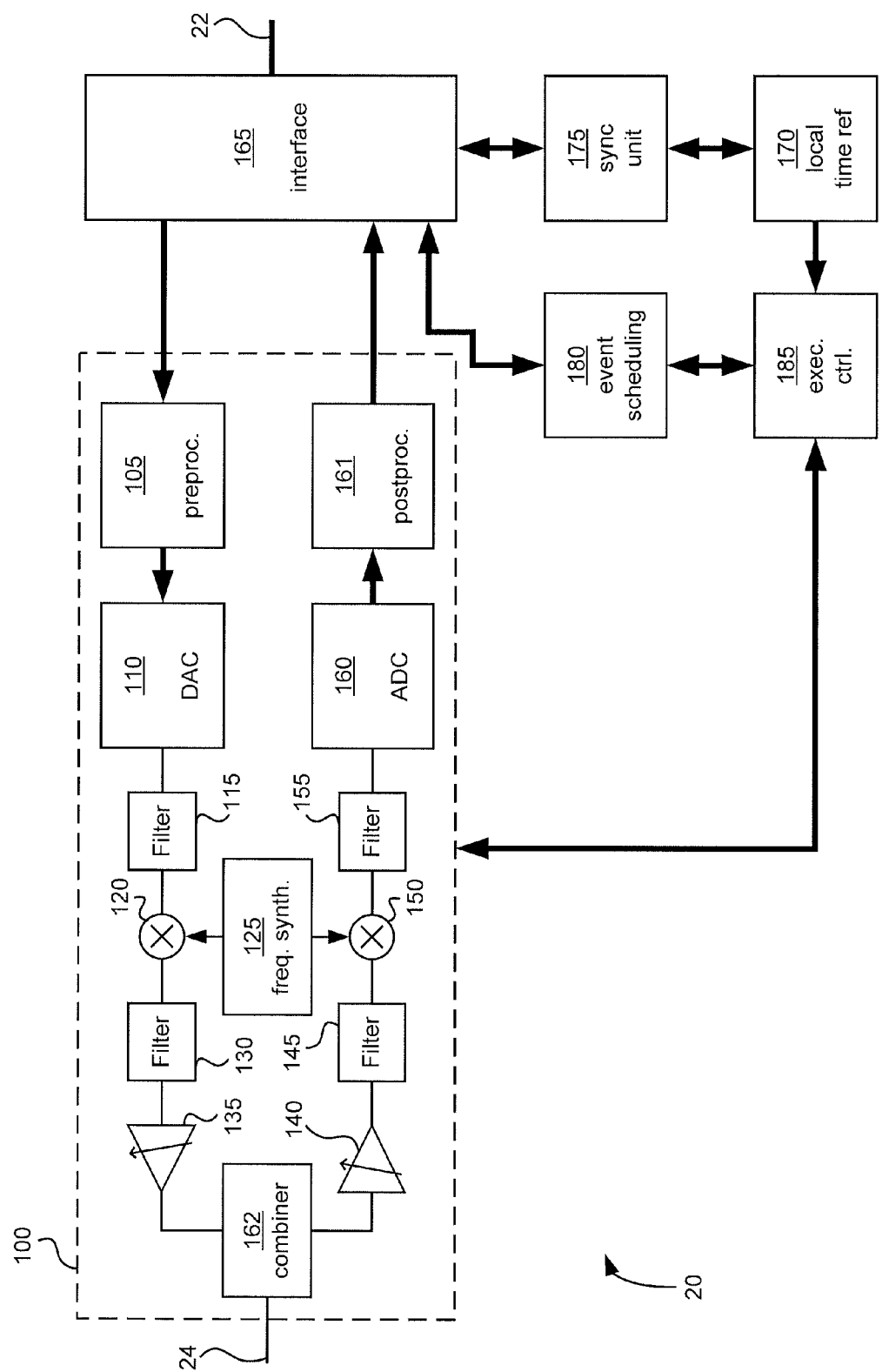
FIG. 3 is a block diagram of a radio circuit according to an embodiment of the invention.

FIG. 3 shows a block diagram of the radio circuit 20 according to an embodiment of the invention. According to this embodiment, the radio circuit 20 comprises transmit and receive (Tx/Rx) circuitry 100 adapted to be operatively connected to an antenna via the RF port 24 of the radio circuit 20 for receiving and/or transmitting RF signals. In FIG. 3, examples of hardware units that may be comprised in the Tx/Rx circuitry 100 are shown. As illustrated in FIG. 3, the Tx/Rx circuitry 100 may comprise a transmit path and a receive path.

The transmit path may e.g. comprise a digital preprocessing unit 105. The digital preprocessing unit 105 may be arranged to perform various signal processing operations on digital signals, e.g. from the DBB 10. The various signal processing operations may e.g. include upsampling and/or filtering. Furthermore, the transmit path may e.g. comprise a digital-to-analog converter (DAC) 110 for converting digital signals, e.g. from the digital preprocessing unit 105, into an analog representation. The transmit path may further comprise a filter 115 arranged to filter an output signal of the DAC 110, e.g. for bandwidth limiting said output signal. Furthermore, the transmit path may comprise an upconversion mixer 120 for upconverting an output signal of the filter 115 by mixing the output signal of the filter 115 with a local oscillator (LO) signal from a frequency synthesizer 125. Moreover the transmit path may comprise a filter 130, e.g. for attenuation of unwanted spectral images from an output signal of the upconversion mixer 120. An output signal of the filter 130 may be fed to an input terminal of a power amplifier (PA) 135 with variable gain arranged to feed the signal to be transmitted to the antenna 35 (FIG. 2). It may be necessary to compensate for a nonlinear behavior of the PA 135 to reduce the amount of spurious signal components that may appear e.g. in adjacent channels. Such compensation may e.g. be accomplished by means of predistortion. The predistortion may e.g. be performed in the digital domain. For example, the digital preprocessing unit 105 may be arranged to perform predistortion operations. Alternatively, the predistortion may be performed in the analog domain, e.g. by means of a dedicated analog predistortion unit (not shown in FIG. 3).

The receive path may comprise a low-noise amplifier (LNA) 140 with variable gain for amplifying a received signal. Furthermore, the receive path may comprise a filter 145 for removing out-of-band noise and distortion from the output signal of the LNA 140. The output signal from the filter 145 may be fed to a downconversion mixer 150 arranged to downconvert the output signal from the filter 145 by mixing the output signal from the filter 145 with an LO signal from the frequency synthesizer 125. An anti-aliasing filter 155 may be included in the receive path for bandwidth limiting the output signal from the mixer 150. Furthermore, the receive path may comprise an analog-to-digital converter (ADC) 160 for converting an output signal from the anti-aliasing filter 155 to a digital representation, e.g. for further processing in the DBB 10 (FIG. 2). Moreover, the receive path may comprise a digital postprocessing unit 161. The digital postprocessing unit 161 may be arranged to perform various signal processing operations on digital signals output from the ADC 160. The various signal processing operations may e.g. include downsampling and/or filtering.

The Tx/Rx circuitry 100 illustrated in FIG. 3 is merely an example. Other types of Tx/Rx circuitry may be used as well in various embodiments. For example, the transmit path may be arranged to perform upconversion using more than one upconversion step via one or more intermediate frequencies (IFs). Similarly, the receive path may be arranged to perform downconversion using more than one downconversion step via one or more IFs. According to some embodiments, the digital preprocessing unit 105 and/or the digital postprocessing unit 161 may be omitted. Furthermore, the transmit and/or the receive path may be arranged for operation in quadrature using in-phase (I) and quadrature (Q) signal paths. Moreover, in FIG. 3, the transmit and receive paths are operatively connected to the same RF terminal via a combiner circuit 162. According to some embodiments, the transmit and receive paths may be operatively connected to separate dedicated RF terminals. Modifications of the Tx/Rx circuitry 100 of FIG. 3 other than those listed in the foregoing may be made as well.

According to the embodiment illustrated in FIG. 3, the radio circuit 20 comprises an interface unit 165. The interface unit 165 is arranged for communicating data and/or commands over the communication link 30 between the DBB 10 and the radio circuit 20. The interface unit 165 may e.g. be, but is not limited to, an interface unit arranged to operate in accordance with the DigRF standard.

Furthermore, according to the embodiment illustrated in FIG. 3, the radio circuit 20 comprises an event-scheduling unit 180. The event-scheduling unit 180 is arranged to receive event-request commands from the DBB 10, e.g. via the interface unit 165. Each event-request command specifies an event to be executed in the radio circuit 20 and a time instant at which the specified event is to be executed. Furthermore, the event-scheduling unit 180 is arranged to schedule the event specified in an event-request command to be executed on the specified time instant in response to receiving the event-request command.

Moreover, according to the embodiment illustrated in FIG. 3, the radio circuit 20 comprises a local time-reference unit 170. The local time-reference unit 170 of the radio circuit 20 may be implemented in the same or a similar way as the time-reference unit 14 of the DBB 10 (FIG. 2). For example, according to some embodiments, the local time-reference unit 170 may comprise a counter. Said counter may e.g. be triggered by a positive or negative edge of a signal, such as a clock signal of the communication circuit 5. Hence, a counter value of the counter in the local time-reference unit 170 may indicate the number of (positive or negative) clock signal edges that have passed since the previous reset (or overflow) of the counter. Said counter value may be used as a reference-time value for accurate timing of events in the radio circuit 20.

According to the embodiment illustrated in FIG. 3, the radio circuit 20 comprises a synchronization unit 175. The synchronization unit 175 is adapted to synchronize the local time-reference unit 170 with the time-reference unit 14 in the DBB 10 in response to a synchronization command. According to some embodiments, such a synchronization command may be issued by the DBB 10. Then, the synchronization unit 175 may e.g. be arranged to receive the synchronization command via the interface unit 165. Additionally or alternatively, the radio circuit 20 may be adapted to issue a synchronization command.

According to the embodiment illustrated in FIG. 3, the radio circuit 20 comprises an execution-control unit 185. The execution control unit 185 is arranged to issue execution of each event scheduled by the event scheduling unit at the scheduled time instant based on time information from the local time reference unit. Since the local time-reference unit 170 can be synchronized with the time-reference unit 14 of the DBB 10 (FIG. 2), the DBB 10 may efficiently and with accurate timing control execution of events in the radio circuit 20 by means of event-request commands. No dedicated strobe signal from the DBB 10 to the radio circuit 20 is needed for timing events to be executed in the radio circuit 20, which is an advantage. Furthermore, by appropriate design of the local time-reference unit 170 in the radio circuit and the time-reference unit 14 in the DBB 10, e.g. by using a large enough number of bits in counters comprised in these units, events can be scheduled well in advance. This may be advantageous if a large number of events should be scheduled to be executed simultaneously or almost simultaneously. If a command, from the DBB 10 to the radio circuit 20, to schedule an event needs to be sent closely in time to when the event should be executed, the bandwidth of communication link 30 (FIG. 2), e.g. in terms of the number of commands that can be sent over the communication link 30 per unit time, may pose a bottleneck for the number of events that can be scheduled to be executed simultaneously or almost simultaneously. Such a bandwidth problem can be alleviated if events can be scheduled well in advance. Moreover, since an event-request command specifies the time instant when the event is to be executed by means of an absolute time value, i.e. not relative to a preceding event, a next strobe event, or the like, event request commands do not have to be sent in the same order as the corresponding events are to be executed, which is an advantage e.g. in that it enhances flexibility.

The synchronization unit 175 may be arranged to synchronize the local time-reference unit 170 of the radio circuit 20 with the time-reference unit 14 in the DBB 10 (FIG. 2) in various different ways in various embodiments. In the following, the reference time of the time-reference unit 14 is referred to as DBB time and the reference time of the local time-reference unit 170 is referred to as radio time. According to some embodiments, the local time-reference unit 170 and the time-reference unit 14 may be synchronized in the sense that the DBB time and the radio time are set essentially equal. Thereby, the DBB 10 may issue an event-request command specifying an event to be executed at a given time instant represented by a reference-time value in DBB time. The event-scheduling unit 180 may then schedule the event to be executed at a time instant represented by that same reference-time value, without modification, in radio time. According to some embodiments, setting the DBB time and the radio time essentially equal may be accomplished by setting the reference-time value of the local time-reference unit 170 equal to the current reference-time value of the time-reference unit 14. According to some embodiments, setting the DBB time and the radio time essentially equal may be accomplished by setting the reference-time value of the time-reference unit 14 equal to the current reference-time value of the local time-reference unit 170. According to some embodiments, setting the DBB time and the radio time essentially equal may be accomplished by simultaneously setting the reference-time values of the local time-reference unit 170 and the reference-time value of the time-reference unit 14 equal to a predetermined value, e.g. by simultaneously resetting the local time-reference unit 170 and the time reference unit 14.

According to some embodiments, the local time-reference unit 170 and the time-reference unit 14 may be synchronized in the sense that the DBB 10 is made aware of a time difference, or offset, between DBB time and radio time. For example, the synchronization unit may be adapted to, in response to a synchronization command, communicate a current reference-time value of the local time-reference unit 170 to the DBB 10. Based on said current reference-time value of the local time-reference unit 170, the DBB 10 may compute the offset between DBB time and radio time. The DBB 10 may then compensate for the offset when issuing an event-request command. For example, since the DBB 10 is aware of the offset, it may issue an event-request command that specifies a time instant represented with a reference-time value in radio time.

According to some embodiments, the local time-reference unit 170 and the time-reference unit 14 may be synchronized in the sense that the radio circuit 20 is made aware of the offset between DBB time and radio time. For example, a synchronization command issued by the DBB 10 may include information indicating a current reference-time value of the time-reference unit 14. Based on said current reference-time value of the time-reference unit 14, the synchronization unit 175 may compute the offset between DBB time and radio time. The radio circuit 20 may then compensate for the offset when scheduling or executing events. For example, the DBB 10 may issue an event-request command that specifies a time instant represented with a reference-time value in DBB time. The event-scheduling unit 180 may then e.g. translate said reference-time value in DBB time to the corresponding reference-time value in radio time based on the offset, and schedule the event specified in the event-request command to be executed at a time instant represented with said corresponding reference-time value in radio time. Alternatively, the event-scheduling unit 180 may be adapted to schedule the event to be executed at a time instant represented with the reference-time value in DBB time. The execution-control unit 185 may then instead be arranged to compensate for the offset by translating the reference-time value, with which the event has been scheduled by the scheduling unit 180, to the corresponding reference-time value in radio time and use this translated reference-time value for accurate timing control of execution of the event.

According to some embodiments, the synchronization unit 175 may be arranged to set the reference-time value of the local time-reference unit 170 to a specific time value indicated by a synchronization command in response to the synchronization command. The specific time value may be explicitly indicated by (e.g. included with) the synchronization command. As a nonlimiting example, the specific time value may be a current reference-time value of the time-reference unit 14 in the DBB 10. Alternatively, the specific time value may be implicitly indicated by the synchronization command. As a nonlimiting example, the synchronization command may be a command for resetting a counter in the local time-reference unit 170.

According to some embodiments, the timing-accuracy requirements are such that a latency of the communication link 30 (FIG. 2) between the DBB 10 and the radio circuit 20 needs to be taken into account when synchronizing the local time-reference unit 170 in the radio circuit 20 with the time-reference unit 14 in the DBB 10. According to some embodiments, the latency is known in advance, e.g. from computer simulations during design of the communication circuit 5. According to some embodiments, the latency may be determined based on measurements in the communication circuit 5 during run time. For example, if the latency in the communication link 30 between the DBB 10 and radio circuit 20 is symmetric, the latency can be measured by means of a loopback request command. The DBB 10 may send a loop-back request command to the radio circuit 20. In response thereto, the radio circuit 20 may return a confirmation command to the DBB 10. The difference between the time when the loop-back request command was sent and the time the confirmation command was received at the DBB 10 constitutes the total latency in the communication link 30. Half this value therefore represents the latency in one direction. Hence, the loopback request command facilitates determination in the DBB 10 of the latency of the communication link 30.

The latency may e.g. be taken into account when issuing a synchronization command. For example, in an embodiment where the DBB 10 is arranged to issue synchronization commands instructing the synchronization unit 175 to set the reference-time value of the local time-reference unit 170 in the radio circuit 20 equal to the reference-time value of the time-reference unit 14 in the DBB 10, the DBB 10 may add the latency to the current reference time value when sending the synchronization command and include the resulting sum in the synchronization command. Hence, said sum represents the correct current reference-time value of the time-reference unit 14 in the DBB 10 when the synchronization command is received by the radio circuit 20, whereby accurate synchronization of the local time-reference unit 170 in the radio circuit 20 and the time-reference unit 14 in the DBB 10 is facilitated.

In an alternative embodiment, the latency may be known by the radio circuit 20. For example, the latency may be communicated to the radio circuit 20 from the DBB 10. Alternatively, the radio circuit 20 may be responsible to measure the latency by sending a loop-back request command to the DBB 10, which in response thereto returns a confirmation command to the radio circuit 20 for facilitating measurement of the latency by the radio circuit 20. The latency may then be compensated for in the radio circuit 20, e.g. by the synchronization unit 175. For example, the synchronization unit 175 may be arranged to add the latency to a reference-time value of the time-reference unit 14 included in a synchronization command from the DBB 10 to obtain the correct current reference-time value of the time-reference unit 14 when the synchronization command is received by the radio circuit 20.

The events that the radio circuit 20 is adapted to schedule and execute in response to event-request commands from the DBB 10 may vary between different embodiments of the radio circuit 20. Some nonexhaustive examples of events that the radio circuit 20 may be adapted to execute are presented in the following.

Reconfiguration Events:

The radio circuit 20 may be adapted to schedule and execute reconfiguration events. Examples of reconfiguration events are events for reconfiguration of filters (e.g. filter 115, 130, 145 and/or 155 in FIG. 3), such as filter order, bandwidth, center frequency, etc. Other examples of reconfiguration events are events for reconfiguration of operating points for various hardware units in the Tx/Rx circuitry 100 (FIG. 3), events for reconfiguration of the frequency synthesizer 125, e.g. for changing frequency. Yet other examples of reconfiguration events include events for reconfiguration of an amplifier, such as the amplifiers 135 and 140 in FIG. 3, e.g. for changing gain or dynamic range of the amplifier. Further examples of reconfiguration events include events for reconfiguration of a data converter, e.g. the DAC 110 or the ADC 160 in FIG. 3, e.g. for changing sampling frequency, resolution, or, in the case of a $\Delta\Sigma$ ADC or DAC, for changing the order of the $\Delta\Sigma$ ADC or DAC. Moreover, reconfiguration events may include events for reconfiguring the digital preprocessing unit 105 and or the digital postprocessing unit 161, e.g. for changing sample-rate conversion factors for upsampling and/or downsampling.

Measurement Events:

The radio circuit 20 may be adapted to schedule and execute measurement events. A measurement event may e.g. be an event for initiating measurement of a state of a hardware unit in the Tx/Rx-circuitry 100. Such states may e.g. include a signal level (e.g. power or amplitude) at an input terminal or an output terminal of a filter or an amplifier, whether a $\Delta\Sigma$ ADC or DAC is close to saturation, etc. The radio circuit 20 may e.g. comprise dedicated measurement units (not shown) adapted to perform such measurements. Furthermore, a measurement event may be an event for collecting measurement results, e.g. from the measurement units, and reporting the measurement results to the DBB 10.

Power Saving Events:

The radio circuit 20 may be adapted to schedule and execute power saving events. Power saving events may e.g. include power-down and power-up events, e.g. for turning off and on, respectively, a power-supply voltage of the whole or part of the Tx/Rx circuitry 100. Furthermore, power saving events may include sleep and wake-up events, e.g. for disabling and enabling, respectively, one or more clock signals controlling hardware units in the Tx/Rx circuitry 100.

Calibration Events:

The radio circuit 20 may be adapted to schedule and execute calibration events. Calibration events may e.g. include events for calibration of hardware units in the Tx/Rx circuitry 100 during run time. Examples of hardware units that may be subject to calibration may include one or more of filters, DACs, ADCs, and oscillators. Additionally or alternatively, calibration events may include calibration of predistortion settings (e.g. in the digital preprocessing unit 105 or a dedicated analog predistortion unit).

Calibration events may additionally or alternatively include events for coarse calibration of hardware units in the Tx/Rx circuitry 100 during manufacturing, e.g. for determining default calibration settings. For such calibration during manufacturing, test signals may be generated in the transmit path in the Tx/Rx circuitry 100 of the radio circuit 20 and injected into the receive path in the Tx/Rx circuitry 100 of the same radio circuit 20, e.g. either all the way via the antenna 35 or by closing a switch (not shown) between an internal node in the transmit path and an internal node in the receive path, for facilitating the manufacturing calibration. Thereby, the amount of external equipment needed for manufacturing calibration, e.g. measurement equipment, analyzer equipment, signal sources, etc., may be reduced. Utilizing embodiments of the present invention for efficient scheduling of calibration events during manufacturing may reduce the time required for manufacturing calibration.

Furthermore, calibration events may include events for resetting one or more calibration settings of hardware units in the Tx/Rx circuitry 100 to a default setting determined during manufacturing.

Data Transmission Events:

The radio circuit 20 may be adapted to schedule and execute events associated with transmission of data. For example, an event-request command may specify that a transmission of a particular set of data should be started at a given time instant. The signal samples representing said set of data may e.g. be included with the event-request command. Alternatively, the signal samples may be transferred from the DBB 10 to the radio circuit 20 separately from the event request command and temporarily stored in a signal buffer unit (not shown in FIG. 3) of the radio circuit 20.

Debugging Events:

The radio circuit 20 may be adapted to schedule and execute events associated with debugging. For example, debugging events may include reconfiguration of interconnection between hardware units in the radio circuit 20, disabling and/or power off of hardware units in the radio circuit 20, etc., in order to facilitate testing of individual hardware units or groups of hardware units in the radio circuit 20.

The DBB 10 may e.g. be adapted to select the time instant associated with some of the events listed above, e.g. reconfiguration and/or calibration events, such that transmission of data is not interrupted and/or interfered with.

According to some embodiments, the DBB 10 may send commands to the radio circuit 20 for requesting events to be executed in the radio circuit immediately, or as soon as possible. Such events are in the following referred to as prioritized events and the commands for requesting prioritized events are referred to as prioritized event-request commands. Hence, according to some embodiments, the event-scheduling unit 180 is arranged to receive prioritized event-request commands that specify a prioritized event to be executed in the radio circuit 20 from the DBB 10. Furthermore, the event-scheduling unit may be adapted to schedule a prioritized event, which is specified in a prioritized event-request command, for immediate execution in response to receiving the prioritized event-request command. Furthermore, the execution-control unit 185 is arranged to issue immediate execution of each event scheduled for immediate execution. An example of a prioritized event-request command is the loop-back request command mentioned above for facilitating latency measurements, in response to which the event of returning a confirmation command to the DBB 10 is immediately executed in the radio circuit 20.

Figure 4:
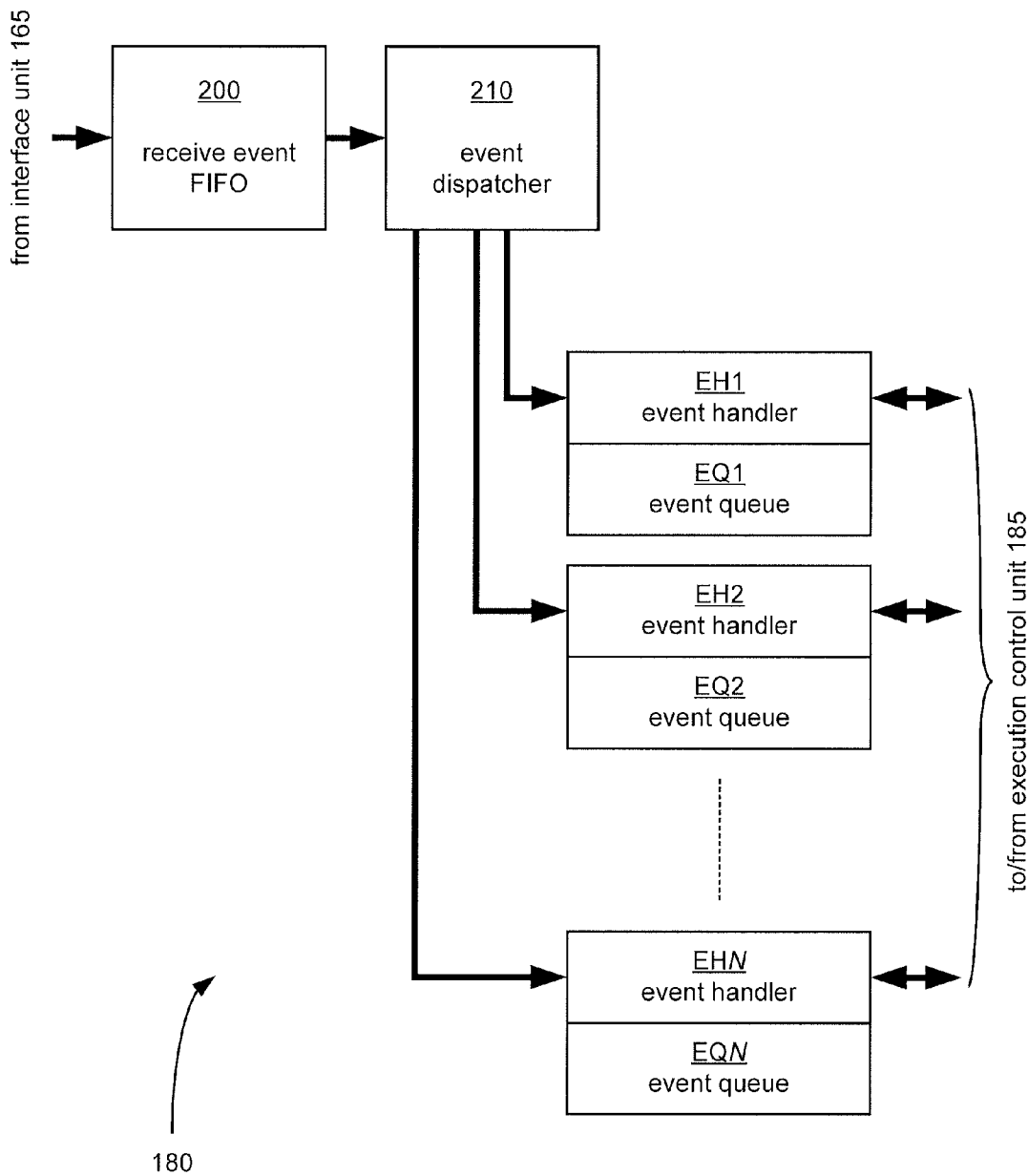
FIG. 4 is a block diagram of an event-scheduling unit according to an embodiment of the invention.

FIG. 4 is a block diagram of the event-scheduling unit 180 according to an embodiment of the invention. According to the embodiment, the event scheduling unit 180 comprises at least one event queue EQ1-EQN for storing events to be executed. Events may e.g. be stored in an event queue EQ1-EQN in the form of an event identifier that identifies the event to be executed and a time stamp indicating the time instant at which the event is to be executed. Furthermore, data associated with an event may be stored along with the event in the event queue EQ1-EQN. For example, if the event is a configuration event, the associated data may be configuration data, such as one or more parameter values. As another example, if the event is a data transmission event, the associated data may be data to be transmitted. According to some embodiments, data associated with an event may be comprised in an event-request command. Hence, according to some embodiments, the event-scheduling unit 180 may be adapted to receive event-request commands comprising data associated with the event specified in the event-request command.

Furthermore, for each of the at least one event queue EQ1-EQN, the embodiment of the event-scheduling unit illustrated in FIG. 4 comprises an event-handler unit EH1-EHN adapted to store events in the event queue EQ1-EQN sorted in an order of the time instant associated with each event. Each of the event handlers EH1-EHN may be operatively connected to the execution-control unit 185 (FIG. 3) for communicating information (e.g. event identifier and time stamp) to the execution-control unit 185 regarding the next event to be executed in the corresponding event queue EQ1-EQN, thereby enabling the execution-control unit 180 to issue execution of the event at the scheduled time instant. Each event queue EQ1-EQN and corresponding event handler EH1-EHN may e.g. be assigned to handle events relating to a specific hardware unit or group of hardware units, or to handle a specific type of event or group of events. Using a plurality of event queues may facilitate efficient simultaneous execution of different events. For example, the execution-control unit 185 (FIG. 3) may comprise a plurality of sub units (not shown). The sub units may be arranged to operate in parallel and each of the sub units may be arranged to control the execution of events in a unique one of the plurality of event queues EQ1-EQN independently of the other sub units.

According to some embodiments, the radio circuit 20 may be adapted to report errors and/or warnings to the DBB 10 over the communication link 30. For example, the radio circuit 20 may be adapted to report one or more of a calibration error, overflow in an event queue EQ1-EQN, an event-time error (i.e. that a scheduled event could not be executed on the specified time instant, e.g. due to a bug or a conflict with another event), and a faulty or defect hardware unit to the DBB 10. Furthermore, the radio circuit 20 may be adapted to report status information to the DBB 10 over the communication link. For example, the radio circuit 20 may be adapted to report that the execution of an event has been completed. Additionally or alternatively, the radio circuit 20 may be adapted to detect and report a change in an operating condition, such as but not limited to a temperature change. In response thereto, the DBB 10 may be adapted to take appropriate action, e.g. issue event-request commands to the radio circuit 20 for measurement events and/or calibration events.

According to embodiments described so far in this specification, the event-scheduling unit 180 and the execution-control unit 185 have been illustrated as separate hardware units. However, according to some embodiments, the event-scheduling unit 180 and the execution-control unit 185 may be merged. For example, the execution-control unit 185, or parts thereof, may be merged with the event handler units EH1-EHN in the event-scheduling unit 180.

As illustrated in FIG. 1, the event-scheduling unit 180 may comprise a first-in/first-out memory (FIFO) 200. The FIFO 200 may be operatively connected to the interface unit 165 for receiving event-request commands from the DBB 10. Furthermore, the event-scheduling unit 180 may comprise an event-dispatcher unit 210. The event-dispatcher unit may be arranged to retrieve event-request commands from the FIFO 200. Furthermore, the event-dispatcher unit 210 may be arranged to, for each event-request command retrieved from the FIFO 200, forward the event associated with the event-request command to one of the event-handler units EH1-EHN for storage in the associated event queue EQ1-EQN. For example, the event-request command may comprise address information that enables the event-dispatcher unit 210 to identify which of the event-handler units EH1-EHN that should be the recipient of the event. The address information comprised in an event-request command may e.g. indicate a hardware unit or group of hardware units that the event is targeting, thereby facilitating for the event dispatcher unit 210 to forward the event to the appropriate event handler unit EH1-EHN associated with said hardware unit or group of hardware units.

Figure 5:
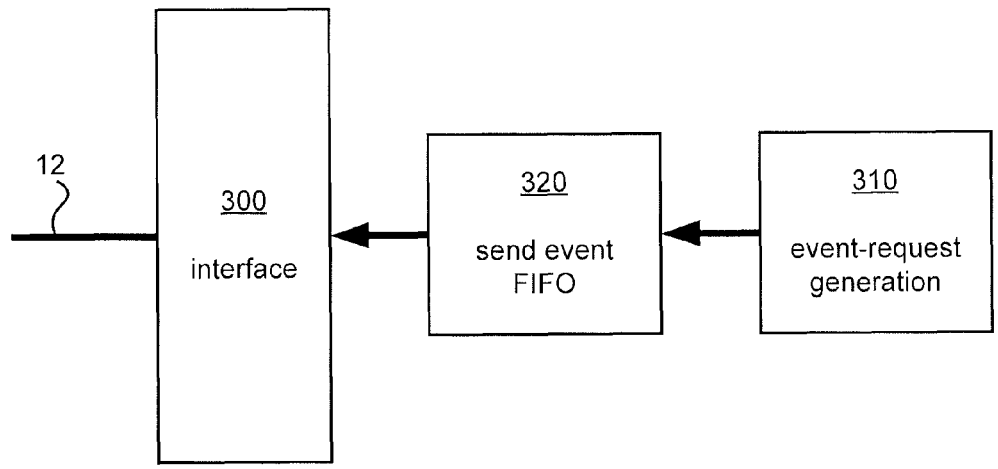
FIG. 5 is a block diagram of part of a digital baseband circuit according to an embodiment of the invention.

FIG. 5 shows a block-diagram of part of the DBB 10 according to an embodiment of the invention. According to the embodiment, the DBB 10 comprises an interface unit 300. The interface unit 300 is arranged for communicating data and/or commands over the communication link 30 between the DBB 10 and the radio circuit 20. The interface unit 300 may e.g. be, but is not limited to, an interface unit arranged to operate in accordance with the DigRF standard. Furthermore, the DBB 10 may comprise an event-request generation unit 310 for generating event-request commands to be sent to the radio circuit 10. Moreover, the DBB 10 may comprise a FIFO 320 for temporary storage of event-request commands. The event-request generation unit 310 is adapted to send generated event-request commands to the FIFO 320 for temporary storage therein. The interface unit 300 is adapted to continuously read temporarily stored event-request commands from the FIFO 320 in accordance with a transmission rate of the interface unit 300 and forward the event-request commands, over the communication link 30 (FIG. 2), to the radio circuit 20.

The radio circuit 20 may be adapted to request events to be executed in the DBB 10. As a nonlimiting example, the radio circuit 20 may be arranged to detect a change in an operating condition, such as but not limited to a temperature change. In response to detecting such a change, the radio circuit 20 may request that the DBB 10 takes appropriate measures to handle the change in operation condition. For example, the radio circuit 20 may request that the DBB 10 calculate one or more new parameter values for one or more settings of one or more hardware units in the radio circuit 20 based on the new operating condition and transfer the new parameter values to the radio circuit 20 on a time instant specified in an event request command from the radio circuit 20 to the DBB 10. Hence, the radio circuit 20 may be adapted to send event-request commands to the DBB 10 over the communication link 30. For that purpose, the radio circuit 20 may comprise one or more units similar or identical to one or more units comprised in the DBB 10 in accordance with the embodiment illustrated in FIG. 5. For example, the radio circuit 20 may comprise an event-request generation unit (not shown in FIG. 3), e.g. similar or identical to the event-request generation unit 310 (FIG. 5) of the DBB 10, adapted to generate event-request commands to be sent to the DBB 10. Furthermore, the radio circuit 20 may comprise a FIFO (not shown in FIG. 3), e.g. similar or identical to the FIFO 320 (FIG. 5) of the DBB 10, arranged to temporarily store event-request commands generated by the event-request generation unit in the radio circuit 20. The interface unit 165 (FIG. 3) in the radio circuit 20 may be adapted to continuously read temporarily stored event-request commands from said FIFO in the radio circuit 20 in accordance with a transmission rate of the interface unit 165 and forward the event-request commands, over the communication link 30 (FIG. 2), to the DBB 10.

Similarly to event request commands sent from the DBB 10 to the radio circuit 20, an event-request command sent from the radio circuit 20 to the DBB 10 may specify an event to be executed in the DBB 10 and a time instant at which the specified event is to be executed. The DBB 10 may be arranged to receive event-request commands from the radio circuit 20. Furthermore, the DBB 10 may be arranged to, in response to receiving an event request-command, schedule the specified event to be executed on the specified time instant. Moreover, the DBB 10 may be arranged to execute each scheduled event at the scheduled time instant based on time information from the time-reference unit 14 of the DBB 10. The DBB 10 may e.g. comprise one or more units similar or identical to one or more units in embodiment of the radio circuit 20 illustrated in FIG. 3. For example, the DBB 10 may comprise an event-scheduling unit (not shown), e.g. similar or identical to the event-scheduling unit 180 (FIG. 3) of the radio circuit 20. The event-scheduling unit of the DBB 10 may be arranged to receive event-request commands from the radio circuit 20, e.g. via the interface unit 300 (FIG. 5). Furthermore, the event-scheduling unit of the DBB 10 may be arranged to schedule the event specified in an event-request command to be executed on the specified time instant in response to receiving the event-request command. Moreover, the DBB 10 may comprise an execution-control unit (not shown), e.g. similar or identical to the execution-control unit 185 (FIG. 3) of the radio circuit 20. The execution control unit of the DBB 10 may be arranged to issue execution of each event scheduled by the event scheduling unit of the DBB 10 at the scheduled time instant based on time information from the time reference unit 14 (FIG. 2) of the DBB 10. Since the local time-reference unit 170 can be synchronized with the time-reference unit 14 of the DBB 10 (FIG. 2), the radio circuit 20 may efficiently and with accurate timing control execution of events in the DBB 10 by means of event-request commands.

According to some embodiments of the invention, a method of operating the radio circuit 20 is provided. The method comprises synchronizing the local time-reference unit 170 of the radio circuit 20 with the time-reference unit 14 in the DBB 10 in response to a synchronization command. Furthermore, the method comprises receiving event-request commands from the DBB 10. Each event request command may specify an event to be executed in the radio circuit 20 and a time instant at which the specified event is to be executed. Moreover, the method may comprise, in response to receiving an event-request command, scheduling the specified event to be executed on the specified time instant. The method may further comprise executing each scheduled event at the scheduled time instant based on time information from the local time reference unit 170 in the radio circuit 20.

Figure 6A:
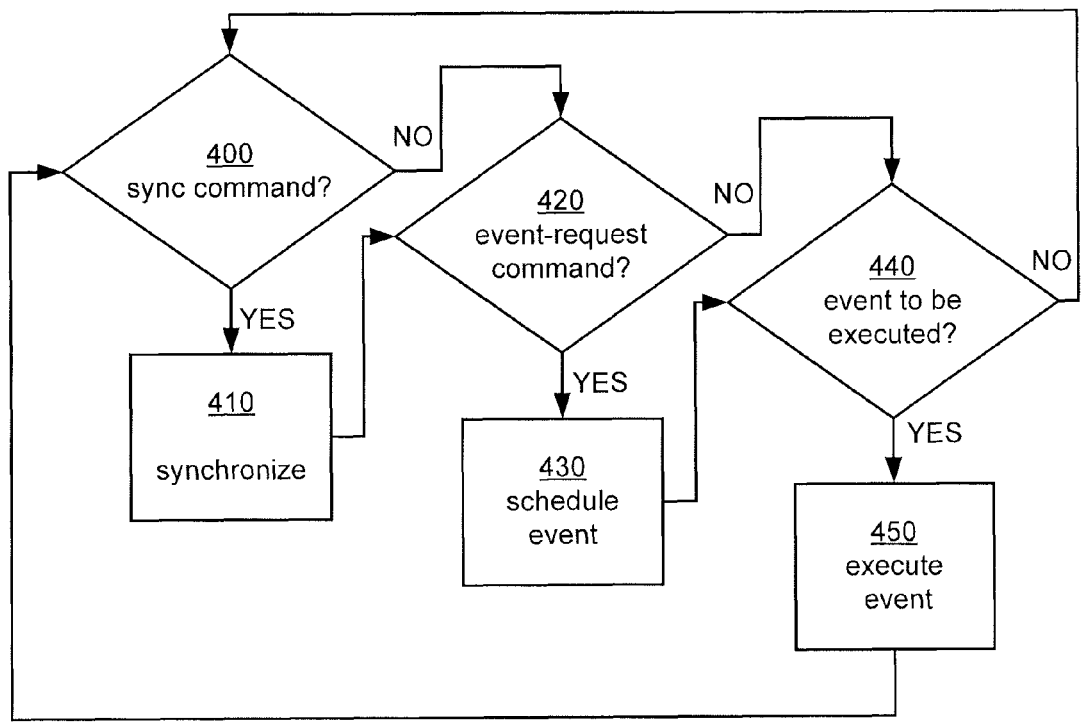
FIGS. 6a and b are flow charts for a method of operating a radio circuit according to embodiments of the invention.

FIG. 6a illustrates a flow chart for an embodiment of the method. According to this embodiment, it is checked in step 400 whether a synchronization command has been issued. If the answer in step 400 is yes, the local time reference unit 170 in the radio circuit 20 is synchronized with the time-reference unit 14 in the DBB 10 in step 410. Thereafter, the method proceeds to step 420. If the answer in step 400 is no, the method proceeds directly to step 420.

In step 420, it is checked whether an event-request command has been received from the DBB 10. If the answer in step 420 is yes, the event specified in the received event-request command is scheduled to be executed at the time instant specified in the event-request command in step 430. Thereafter, the method proceeds to step 440. If the answer in step 420 is no, the method proceeds directly to step 440.

In step 440, the current reference-time value of the local time-reference unit 170 is compared with the time instants associated with scheduled events to determine whether there are any events that should be executed in the radio circuit 20 at the present time instant. If the answer in step 440 is yes, the event(s) to be executed at the present time instant is/are executed in step 450. Thereafter, the method returns to step 400. If the answer in step 440 is no, the method returns directly to step 400.

Figure 6B:
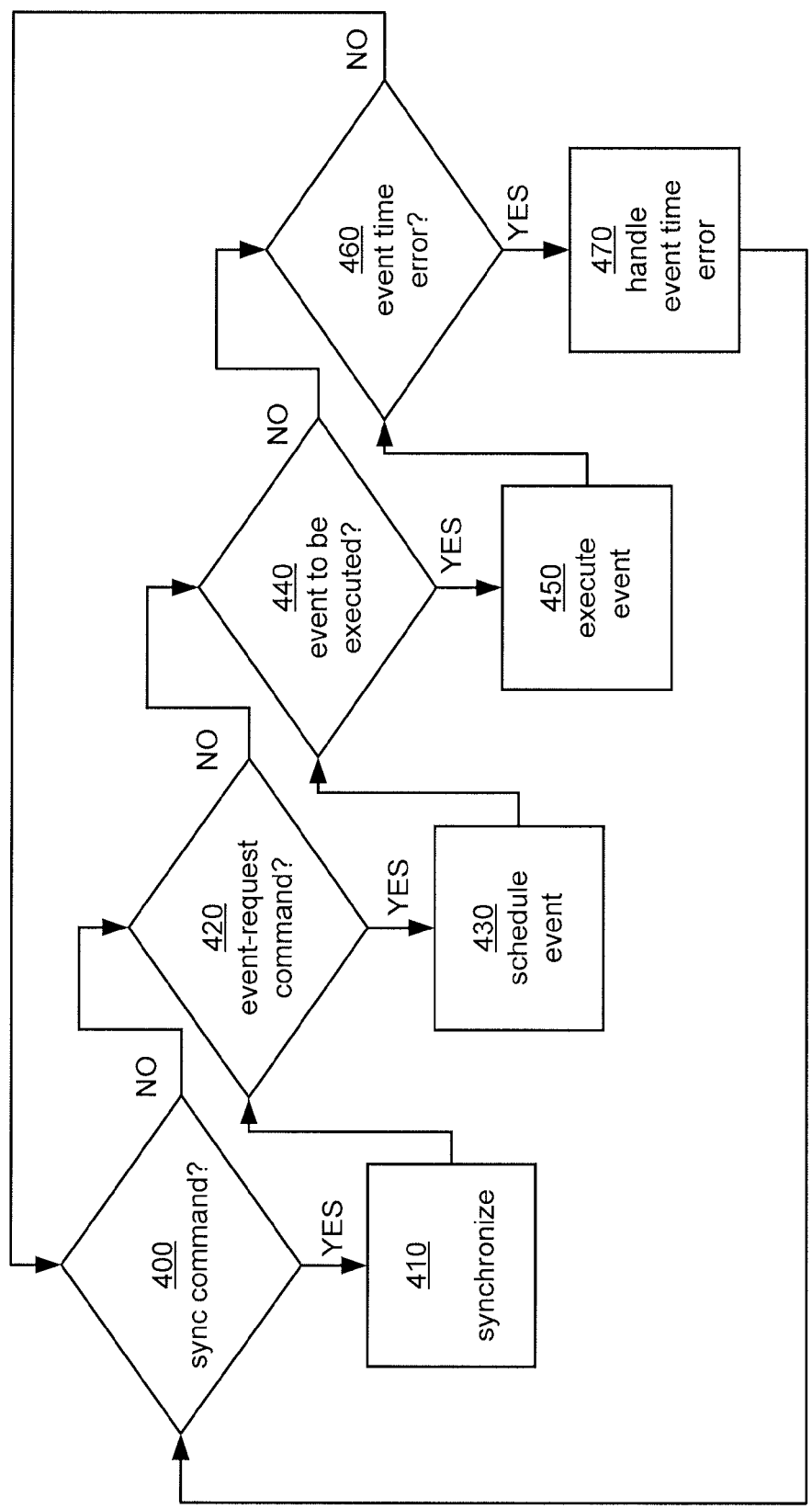

FIG. 6b illustrates a flow chart for another embodiment of the method. In addition to the steps illustrated in FIG. 6a, the embodiment illustrated in FIG. 6b comprises the steps 460 of detecting an event-time error and 470 of handling a detected event-time error. After performing step 450, or if the answer in step 440 is no, the method proceeds to step 460, instead of returning to step 400 as in the embodiment illustrated in FIG. 6a. In step 460, it is checked whether an event-time error has occurred, e.g. if there is an event scheduled by the event-scheduling unit 180 that could not be executed on the scheduled time instant. If the answer in step 460 is yes, the detected event-time error is handled in step 470, e.g. by reporting the event-time error to the DBB 10. Thereafter, the method returns to step 400. If the answer in step 460 is no, the method returns directly to step 400. It is readily appreciated that, in some embodiments, more than one event-time error may be detected in step 460, and more than one event-time error may be handled in step 470.

The flow charts illustrated in FIG. 6a and b are only examples. Various other steps may be included in other embodiments. Furthermore, the steps illustrated in FIG. 6a and b may be performed in a different order in other embodiments. Moreover, steps illustrated as being performed sequentially in FIG. 6a and b may be performed in parallel in other embodiments.

One or more of the units described above, e.g. one or more of the local time-reference unit 170, the synchronization unit 175, the event-scheduling unit 180, and the execution-control unit 185 may be implemented with dedicated, application-specific hardware units. Additionally or alternatively, one or more of the units described above, e.g. one or more of the local time-reference unit 170, the synchronization unit 175, the event-scheduling unit 180, and the execution-control unit 185 may be implemented with programmable hardware units, such as one or more microprocessor, microcontroller, and/or field-programmable gate array (FPGA), programmed and/or configured to perform the function of the units. Hence, embodiments of the invention may be embedded in a computer program product, which enables implementation of the method and functions described herein. Said embodiments of the invention may be carried out when the computer program product is loaded and run in a system having computer capabilities. Computer program, software program, program product, or software, in the present context mean any expression, in any programming language, code or notation, of a set of instructions intended to cause a system having a processing capability to perform a particular function directly or after conversion to another language, code or notation.

The present invention has been described above with reference to specific embodiments. However, other embodiments than the above described are possible within the scope of the invention. Different method steps than those described above, performing the method by hardware or software, may be provided within the scope of the invention. The different features and steps of the invention may be combined in other combinations than those described. The scope of the invention is only limited by the appended patent claims.

The invention claimed is:

1. A radio circuit for operation with a digital baseband circuit, comprising:
   an interface unit for communicating data and commands over a communication link between the digital baseband circuit and the radio circuit;
   an event-scheduling unit arranged to:
   receive event-request commands, wherein each event-request command specifies an event to be executed in the radio circuit and a time instant at which the specified event is to be executed, from the digital baseband circuit; and
   in response to receiving an event request-command, schedule the specified event to be executed on the specified time instant;
   a local time-reference unit that generates a multi-bit time value;
   a synchronization unit adapted to synchronize the local time-reference unit with a time-reference unit in the digital baseband circuit in response to a synchronization command, wherein the time-reference unit in the digital baseband circuit generates a multi-bit time value; and
   an execution-control unit arranged to issue execution of each scheduled event at the scheduled time instant based on time information from the local time-reference unit, wherein the time instant at which the specified event is to be executed is specified as a time value to be generated by the local time-reference unit of the radio circuit or as a time value to be generated by the time-reference unit in the digital baseband circuit.

2. The radio circuit according to claim 1, wherein the event-scheduling unit is arranged to:

receive prioritized event-request commands, wherein each prioritized event request command specifies a prioritized event to be executed in the radio circuit, from the digital baseband circuit; and in response to receiving a prioritized event-request command from the digital baseband circuit, schedule the specified prioritized event for immediate execution; and the execution-control unit is arranged to issue immediate execution of each prioritized event scheduled for immediate execution.

3. The radio circuit according to claim 1, wherein the local time-reference unit comprises a counter.

4. The radio circuit according to claim 1, wherein the synchronization unit is arranged to set the local time-reference unit to a specific time value indicated by the synchronization command.

5. The radio circuit according to claim 1, wherein the synchronization unit is arranged to communicate a current time value of the local time-reference unit to the digital baseband circuit in response to the synchronization command.

6. The radio circuit according to claim 1, wherein the radio circuit is arranged to receive a loop-back request command from the digital baseband circuit and, in response thereto, immediately return a confirmation command to the digital baseband circuit, thereby facilitating determination in the digital baseband circuit of a latency of the communication link between the digital baseband circuit and the radio circuit.

7. The radio circuit according to claim 1, wherein the event-scheduling unit comprises:
at least one event queue; and
for each of the at least one event queue, an event-handler unit adapted to store events in the event queue sorted in an order of the time instant associated with each event.

8. The radio circuit according to claim 7, wherein the event-scheduling unit comprises:
a first-in/first-out memory operatively connected to the interface unit for receiving event-request commands from the digital baseband circuit; and
an event-dispatcher unit arranged to retrieve event-request commands from the first-in/first-out memory and, for each retrieved event-request command, forward an event associated with the event-request command to one of the event handler units based on address information in the event-request command.

9. The radio circuit according to claim 1, wherein the event-scheduling unit is adapted to receive event-request commands comprising data associated with the event specified by the event-request command.

10. The radio circuit according to claim 1, wherein a set of events that the radio circuit is adapted to execute comprises one or more of a reconfiguration event for reconfiguring a hardware unit in the radio circuit, a measurement event for measuring a state of a hardware unit in the radio circuit, a measurement data receive event for receiving measurement data generated during a measurement event, a power-down event, a power-up event, a sleep event, a wake-up event, a calibration event for calibrating a hardware unit in the radio circuit, a data-transmission event, a reset event for restoring a setting of the radio circuit to a default setting, and a debugging event.

11. The radio circuit according to claim 1, wherein the radio circuit is adapted to send event-request commands to the digital baseband circuit for requesting events to be executed in the digital baseband circuit.

12. A communication circuit comprising a radio circuit according to claim 1 and a digital baseband circuit, wherein the digital baseband circuit comprises a time-reference unit and is adapted to issue and send event-request commands to the radio circuit.

13. The communication circuit according to claim 12, wherein the digital baseband circuit is arranged to:
receive event-request commands from the radio circuit, wherein each event request command specifies an event to be executed in the digital baseband circuit and a time instant at which the specified event is to be executed;
in response to receiving an event request-command, schedule the specified event to be executed on the specified time instant; and
execute each scheduled event at the scheduled time instant based on time information from the time-reference unit of the digital baseband circuit.

14. An electronic apparatus comprising a radio circuit according to claim 1.

15. The electronic apparatus according to claim 14, wherein the electronic apparatus is a portable radio communication equipment, a mobile radio terminal, a mobile telephone, a communicator, an electronic organizer, a smartphone, or a computer.

16. The radio circuit according to claim 1, wherein the synchronization unit is adapted to synchronize the local time-reference unit with the time-reference unit in the digital baseband circuit in response to the synchronization command taking into account a latency of the communication link between the digital baseband circuit and the radio circuit.

17. A method of operating a radio circuit, comprising:
synchronizing a local time-reference unit of the radio circuit with a time-reference unit in a digital baseband circuit in response to a synchronization command, wherein the local time-reference unit of the radio circuit generates a multi-bit time value and the time-reference unit in the digital baseband circuit generates a multi-bit time value;
receiving event-request commands, wherein each event-request command specifies an event to be executed in the radio circuit and a time instant at which the specified event is to be executed, from the digital baseband circuit, wherein the time instant at which the specified event is to be executed is specified as a time value to be generated by the local time-reference unit of the radio circuit or as a time value to be generated by the time-reference unit in the digital baseband circuit;
scheduling, in response to receiving an event request-command, the specified event to be executed on the specified time instant; and
executing each scheduled event at the scheduled time instant based on time information from the local time-reference unit.

18. The method according to claim 17, wherein synchronizing the local time-reference unit of the radio circuit with the time-reference unit in the digital baseband circuit in response to the synchronization command comprises synchronizing the local time-reference unit of the radio circuit with the time-reference unit in the digital baseband circuit taking into account a latency of a communication link between the digital baseband circuit and the radio circuit.

19. A computer readable medium having stored thereon a computer program product comprising computer program code means for executing a method when said computer program code means are run by an electronic device having computer capabilities, wherein the method is a method of operating a radio circuit, comprising:
synchronizing a local time-reference unit of the radio circuit with a time-reference unit in a digital baseband circuit in response to a synchronization command, wherein the local time-reference unit of the radio circuit generates a multi-bit time value and the time-reference unit in the digital baseband circuit generates a multi-bit time value;

receiving event-request commands, wherein each event-request command specifies an event to be executed in the radio circuit and a time instant at which the specified event is to be executed, from the digital baseband circuit, wherein the time instant at which the specified event is to be executed is specified as a time value to be generated by the local time-reference unit of the radio circuit or as a time value to be generated by the time-reference unit in the digital baseband circuit;

scheduling, in response to receiving an event request-command, the specified event to be executed on the specified time instant; and executing each scheduled event at the scheduled time instant based on time information from the local time-reference unit.

* * * * *

UNITED STATES PATENT AND TRADEMARK OFFICE
CERTIFICATE OF CORRECTION

PATENT NO.       : 8,548,517 B2
APPLICATION NO.  : 12/934157
DATED            : October 1, 2013
INVENTOR(S)      : Olsson et al.

It is certified that error appears in the above-identified patent and that said Letters Patent is hereby corrected as shown below:

On the Title Page

On Page 2, Item (56), under "OTHER PUBLICATIONS", in Column 2, Line 6, delete "Tuscon," and insert -- Tucson, --, therefor.

In the Specification

In Column 12, Line 58, delete "execution-control unit 180" and insert -- execution-control unit 185 --, therefor.

Signed and Sealed this
Twenty-second Day of July, 2014

Michelle K. Lee
*Deputy Director of the United States Patent and Trademark Office*